United States Patent
Das et al.

(10) Patent No.: US 11,822,675 B2
(45) Date of Patent: Nov. 21, 2023

(54) SECURING CUSTOMER DATA AND INTERNAL REGISTER DATA DURING HARDWARE CHECKSTOPS IN A MULTI-TENANT ENVIRONMENT

(71) Applicant: International Business Machines Corporation, Armonk, NY (US)

(72) Inventors: Raja Das, Bengaluru (IN); Sachin Gupta, Bangalore (IN); Santosh Balasubramanian, Bangalore (IN); Sandeep Korrapati, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/356,708

(22) Filed: Jun. 24, 2021

(65) Prior Publication Data

US 2022/0414233 A1     Dec. 29, 2022

(51) Int. Cl.
*G06F 21/60* (2013.01)
*H04L 9/08* (2006.01)

(52) U.S. Cl.
CPC .......... *G06F 21/602* (2013.01); *H04L 9/0891* (2013.01)

(58) Field of Classification Search
CPC .......... G06F 21/602; G06F 21/575; G06F 21/6245; H04L 9/0891; H04L 9/0894
See application file for complete search history.

(56) References Cited

U.S. PATENT DOCUMENTS

| | | | |
|---|---|---|---|
| 2011/0283286 A1* | 11/2011 | Wu | G06F 1/329 718/103 |
| 2014/0201761 A1* | 7/2014 | Dalal | H04L 67/1097 718/108 |
| 2016/0125188 A1 | 5/2016 | Hall | |
| 2019/0042249 A1* | 2/2019 | Suresh | G06F 9/30036 |
| 2019/0087354 A1 | 3/2019 | Chhabra | |
| 2019/0347213 A1* | 11/2019 | Lutz | G06F 21/602 |
| 2020/0097661 A1 | 3/2020 | Block et al. | |
| 2020/0259632 A1* | 8/2020 | Kishinevsky | G06F 21/602 |

(Continued)

FOREIGN PATENT DOCUMENTS

| | | |
|---|---|---|
| CN | 111190686 A | 5/2020 |
| CN | 111723394 A | 9/2020 |

OTHER PUBLICATIONS

"Patent Cooperation Treaty PCT Notification of Transmittal of the International Search Report and the Written Opinion of the International Searching Authority, or the Declaration", Applicant's file reference F22W2014, International application No. PCT/CN2022/097131, International filing date Jun. 6, 2022, 10 pages.

(Continued)

*Primary Examiner* — Philip J Chea
*Assistant Examiner* — Sangseok Park
(74) *Attorney, Agent, or Firm* — Stephen R. Yoder; Jared Montanaro

(57) ABSTRACT

Providing a method and a corresponding system for encrypting customer workload data through a trusted entity such as a self-boot engine (SBE). More specifically, there is a method and a corresponding system for securely extracting out customer centric data in a manner that requires the customer payloads and/or workloads to register with the SBE and share the encryption key.

18 Claims, 3 Drawing Sheets

(56) References Cited

U.S. PATENT DOCUMENTS

2020/0310972 A1* 10/2020 Shanbhogue ....... G06F 12/1009
2020/0372169 A1 11/2020 Sundaram

OTHER PUBLICATIONS

Disclosed Anonymously, "System and Method for Hiding Sensitive Data from Log Files in A Multi-Tenant Cloud Environment", An IP.com Prior Art Database Technical Disclosure, IP.com No. IPCOM000245011D, IP.com Electronic Publication Date: Feb. 5, 2016, 3 pages.

* cited by examiner

SECURING CUSTOMER DATA AND INTERNAL REGISTER DATA DURING HARDWARE CHECKSTOPS IN A MULTI-TENANT ENVIRONMENT

BACKGROUND

The present invention relates generally to the field of data security, and more particularly to securing user data that is captured during a data dump process.

In this document, the terms hardware checkstop (HW checkstop) and machine-check exception (MCE) are used interchangeably. The Wikipedia entry for "Machine-check exception" (as of Apr. 25, 2021) states as follows: "A machine-check exception (MCE) is a type of computer hardware error that occurs when a computer's central processing unit detects a hardware error in the processor itself, the memory, the I/O devices, or on the system bus; in some architecture an MCE only occur for an unrecoverable error. On x86 architectures, a machine-check exception is not caused by software. However, on other architectures such as PowerPC, certain software bugs such as invalid memory accesses can cause machine-check exceptions. The error usually occurs due to component failure or the overheating or overclocking of hardware components. Most machine check exceptions halt the operating system and require a restart before users can continue normal operation. Diagnosing the failure can be often difficult because so little information about what caused the problem is captured during the error."

SUMMARY

According to an aspect of the present invention, there is a method, computer program product and/or system that performs the following operations (not necessarily in the following order): (i) receiving, by a hardware thread on a processor core, a set of user workload data, with the set of user workload data including sensitive secure information (SSI); (ii) extracting the SSI from the processor core to obtain a first extracted SSI; (iii) registering the first extracted SSI to a self-boot engine (SBE), with the registration including assigning an encryption key for the first extracted SSI; (iv) receiving, by the hardware thread on the processor core, an update to the set of user workload data; (v) responsive to the receipt of the update to the set of user workload data, overwriting the encryption key for the first extracted SSI; and (vi) differentiating, by the SBE, the first extracted SSI and the update to the set of user workload data.

DETAILED DESCRIPTION

Figure 1:
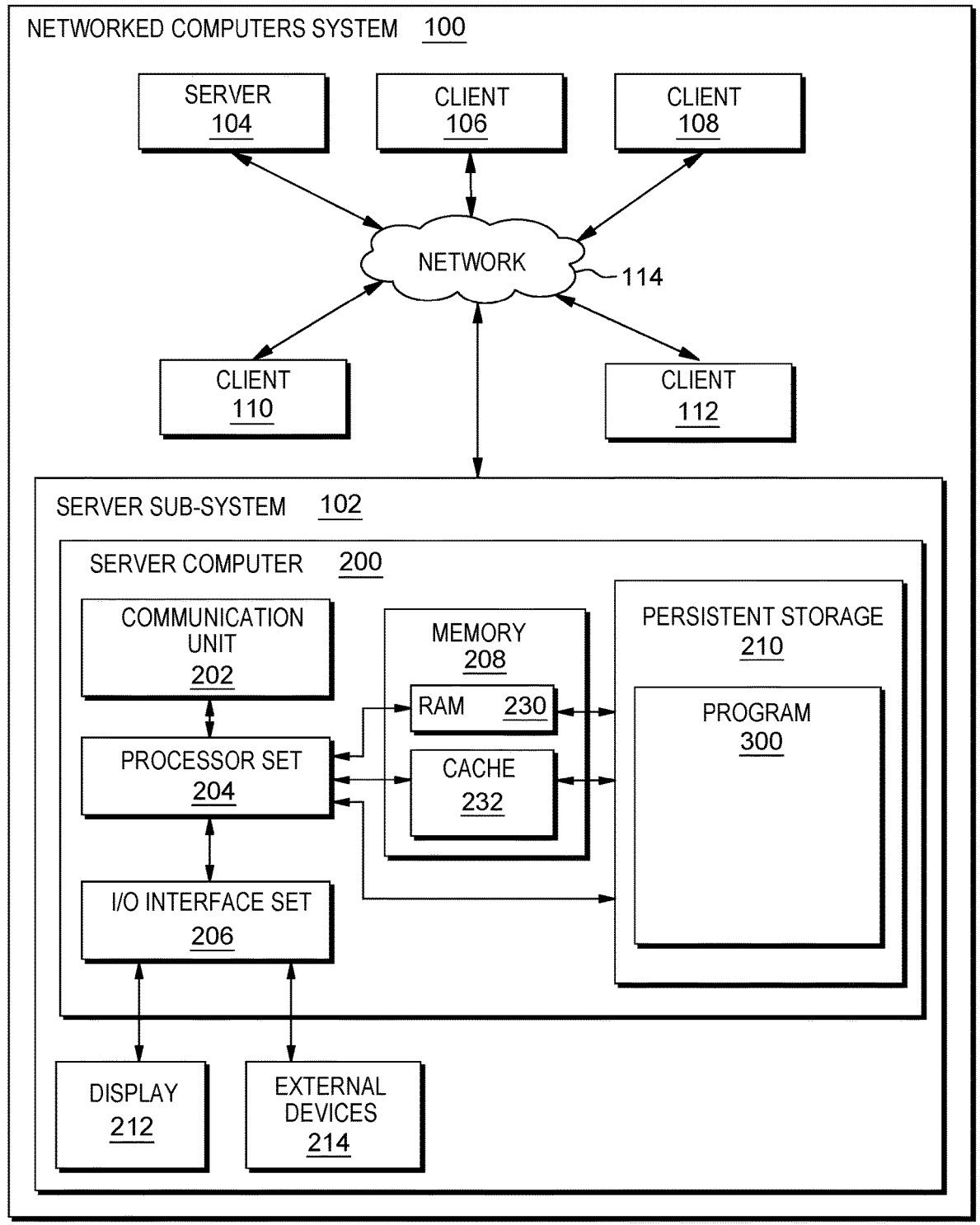
FIG. 1 is a block diagram view of a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
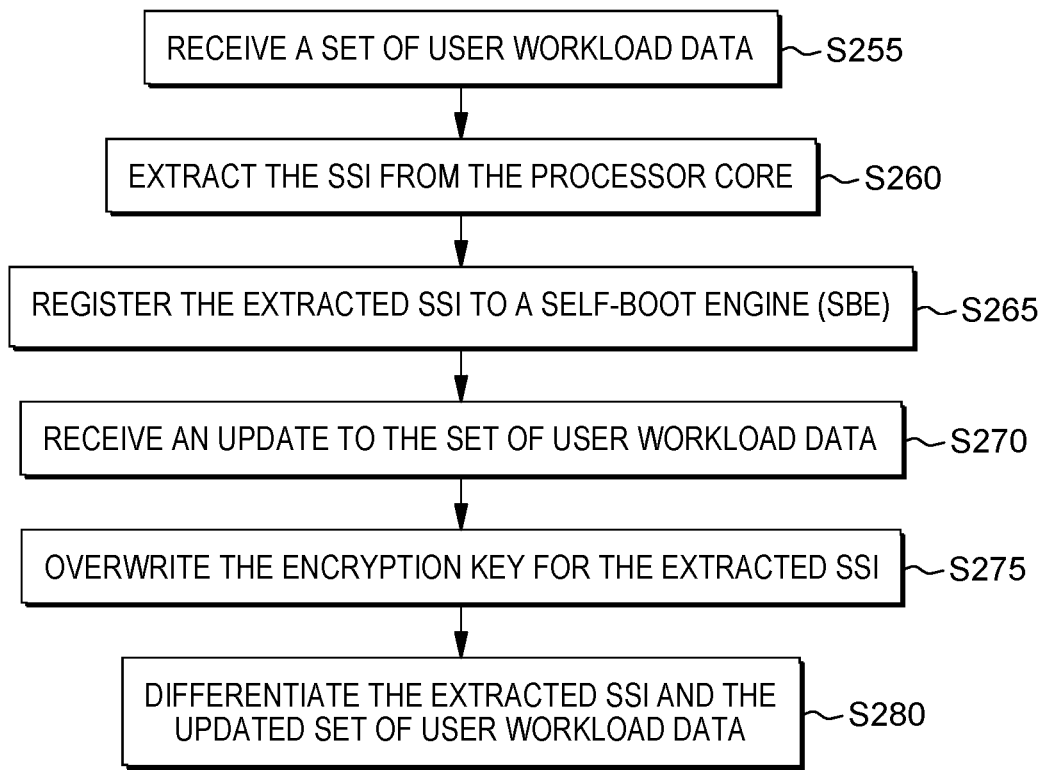
FIG. 2 is a flowchart showing a first embodiment method performed, at least in part, by the first embodiment system.
Figure 3:
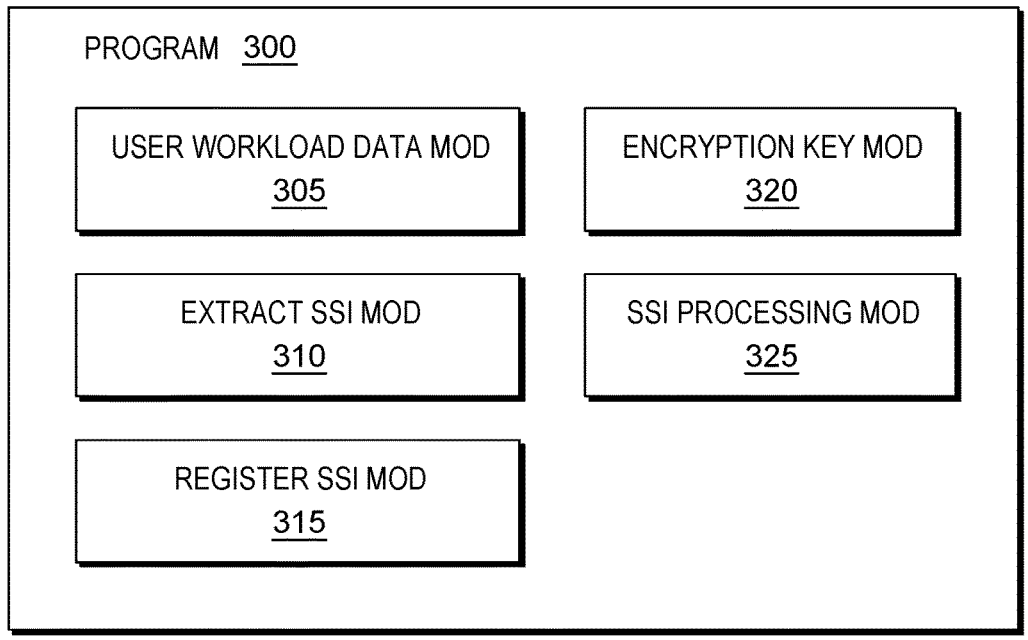
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where user workload data module ("mod") 305 receives a set of user workload data. In some embodiments of the present invention, the set of user workload data includes information that details a user's workflow process. In some instances, the set of user workload data can include sensitive secure information (SSI) that relates to the user's workflow process. In these instances, it is important to ensure that the SSI included in the user workload data is not compromised by being accessed by an unauthorized source.

Processing proceeds to operation S260, where extract SSI mod 310 extracts the SSI from the processor core. In some embodiments, the extracted SSI is processed separately from the remainder of the user workload data. Additionally, in some embodiments, an encryption key is created for the SSI that is initially extracted by extract SSI mod 310.

Processing proceeds to operation S265, where register SSI mod 315 registers the extracted SSI (discussed in connection with operation S260, above) to a self-boot engine (SBE). In some embodiments, the registration of the extracted SSI to the SBE can occur through the use of an Application Program Interface (API) that is available on the host. This registration process is discussed further in Sub-Section III.

Processing proceeds to operation S270, where user workload data mod 305 receives an update to the set of user workload data. In some embodiments, the update to the set of user workload data can include information such as whether a current work payload is allocated to an existing processing core/thread. Alternatively, user workload data mod 305 can determine that an update has not yet been received.

Processing proceeds to operation S275, where encryption key mod 320 overwrites the encryption key for the extracted SSI. Processing finally proceeds to operation S280, where SSI processing mod 325 differentiates the extracted SSI and the updated set of user workload data (discussed in connection with operation S270, above).

III. Further Comments and/or Embodiments

Some embodiments of the present invention recognize the following facts, potential problems and/or potential areas for improvement with respect to the current state of the art: (i) in a server world, keeping the customer data secure is an important goal; (ii) in server deployments, a particular hardware (HW) error/checkstop can make a system go down; (iii) in these cases, it is important to collect HW dump information (such as registers, rings, etc.) that will help in analyzing the cause of certain HW failures; (iv) these registers (SPRs/GPRs) would typically have some customer sensitive data because a given workload is executing instructions over these arithmetic units; and (v) in order to analyze the cause of the failure, hardware engineers may want to know what program was executing on system, and SPR/GPR of the system provides that information which can then be used by system engineers.

Some embodiments of the present invention recognize the following facts, potential problems and/or potential areas for improvement with respect to the current state of the art: (i) one problem of a SPR/GPR data dump is that it may have customer sensitive data; (ii) this issue typically becomes more severe if a given server is hosting multiple workloads belonging to different customers because it is difficult to know how to encrypt the data since there is not necessarily a direction relationship between the hardware data and customer workloads; (iii) currently, the only way to make sure that the customer data is not compromised is to avoid a dump of the SPR/GPR register data; and (iv) however, this limits the system engineer's capability to debug those failures.

Some embodiments of the present invention recognize the following facts, potential problems and/or potential areas for improvement with respect to the current state of the art: (i) in multi-tenant scenarios, multiple workloads share common HW resources; (ii) a hypervisor maintains a shared pool of resources for different partitions dynamically based upon on the workload; (iii) in the case of a hardware checkstop scenario, where all the HW register dump information is needed (which may incidentally contain customer centric data) to debug the special issue, the customer data may get compromised; (iv) an out of band processor (who is in the chain of trusted entity) can help to encrypt these different workload data based on different keys shared by the workload; and (v) this includes the dump data required to debug when a customer workload crashes.

Some embodiments of the present invention recognize the following facts, potential problems and/or potential areas for improvement with respect to the current state of the art: (i) in proprietary systems, there are ways to capture the dump via a Flexible Service Processor, which includes a customer memory dump as well as hardware registers (SPRs/GPRs) of the threads on which customer load is assigned; (ii) this can be used later by the customer/company team to debug the root cause; (iii) hardware threads that are involved in running the customer workload will typically have some customer centric data stored in the registers (SPRs/GPRs) at some point of time; (iv) the register dump is important from a security point of view; (v) in a secure system, the Flexible Service Processor is a non-trusted entity, therefore the dump carried out by the FSP is also not secure; and (vi) currently, there is no process to encrypt the data before fetching it out.

In order to make the data dump secure, certain embodiments of the present invention push the collection of data to a SBE (self-booting engine) which is secure in the chain. In some embodiments, the SBE also has access to all of the Kernel data structures that are running the customer load. Based on this, the SBE will gain access to HW registers (SPRs/GPRs) which are associated with specific customer workload based on the kernel task_struct. Alternatively, there can be multiple customer workload instances that might be running on multiple HW threads at any point of time. Since the SBE is the origination point of the data dump, the SBE can encrypt the data with a relevant customer key that is shared during workload registration. Once the data is encrypted, the data can be fetched out from the SBE and would require a customer decryption key to de-crypt the data.

Some embodiments of the present invention depends on the Flexible Service Processor and how securely it can offload the data. This solution explains how it is possible to secure the data at the source itself.

Some embodiments of the present invention recognize the following facts, potential problems and/or potential areas for improvement with respect to the current state of the art: (i) in an open power class of servers, open BMC is the entity (that is the non-trusted entity) that does not have any major role to capture dump data in a Memory Preserving IPL (MPIPL); (ii) a self-boot engine (SBE, trusted entity) is the entity that captures the Architected Register States for all processors; (iii) each processor has cores and each core has HW threads; (iv) each HW threads have some separate and some common set of SPRs and GPRs; (iv) these SPRs and GPRs are the general purpose registers which are used to execute low level instructions for the customer payload; and (v) at any given point of time, HW threads are assigned by a host kernel for a specific customer payload, which can be derived by looking at the kernel data structures like task_struct which has information related to customer payload that it is running.

The intention here is to show that the architected registers specific to HW threads might contain sensitive customer data that the customer would not want a dump collector entity to know. Similarly on a system, where multiple customer payloads are running, there might be multiple such scenarios.

Consider the following example. Assume that core0 is assigned to customer0 and core1 is assigned to customer1. In this example, all of the SPRs and GPRs with respect to core0 are as follows: (i) core0 has four (4) HW threads for low level execution; (ii) each thread has thirty-two (32) GPRs and sixty-four (64) SPRs; (iii) this results in a total of 384 registers per core (96*4=384 registers per core). Now customer0 and customer1 would like to keep the information available in the 384 registers per core, with that information remaining secure and not available to share with anyone.

Here, if any sensitive data is getting processed in these registers, it might expose the security holes in the customer's workload and is potentially unhelpful from a business standpoint. In some cases, a solution is needed to keep the register data secure.

Some embodiments of the present invention may include one, or more, of the following features, characteristics and/or advantages: (i) securely extracts out the customer centric data; (ii) needs the customer payloads/workloads to register with the SBE and share the encryption key for the same; (iii) this can be done via an API available on the Host; and (iv) the payload can have an encryption key defined at some location where host can pick it up and pass it across to the SBE.

In some embodiments, the SBE needs to store the key with respect to the payload. Any update to the payload (such as whether a new payload is allocated to an existing core/thread), then the same will overwrite the present key in the SBE. In some cases, once this infrastructure is up and a dump of memory and HW registers is required when the payload crashes, then the SBE will be able to differentiate multiple payloads running in the system with the help of kernel data structures (task_struct or its equivalent).

Essentially, the SBE will be able to differentiate the SPRs/GPRs on a thread basis for different payloads. The dump (memory and registers) will then be encrypted with the saved keys per payload. Offloading the encrypted dump may have several ways like Flexible Service Processor helps in fetching out the dump or SBE can copy the dump into a reserved memory space which the payload itself can access when they come back online.

Some embodiments of the present invention may include one, or more, of the following features, characteristics and/or advantages: (i) encrypts the customer workload register data through a trusted entity such as the SBE; (ii) for this encryption to happen, the customer workload needs to share an encryption key with the SBE via a host kernel or through a shared memory which the SBE can access; and (iii) each customer workload would have to do the same if it needs the sensitive register data to get encrypted during MPIPL dump process and does not want the system engineers to decode some sensitive information out of it unless verified by the customer.

Some embodiments of the present invention may include one, or more, of the following features, characteristics and/or advantages: (i) SBE would have access to the host kernel memory, where it will have access to task_struct or an equivalent data structure; (ii) SBE would be able to derive the workload running on specific threads from these structure and would be in a position to encrypt the register data (SPRs/GPRs) with the previous shared customer workload specific key; and (iii) once the complete memory dump and the register dump is obtained, the customer can verify or prune the thread specific register data before system engineers can use the same to debug the Host Kernel/Opal Crash.

Figure 4:
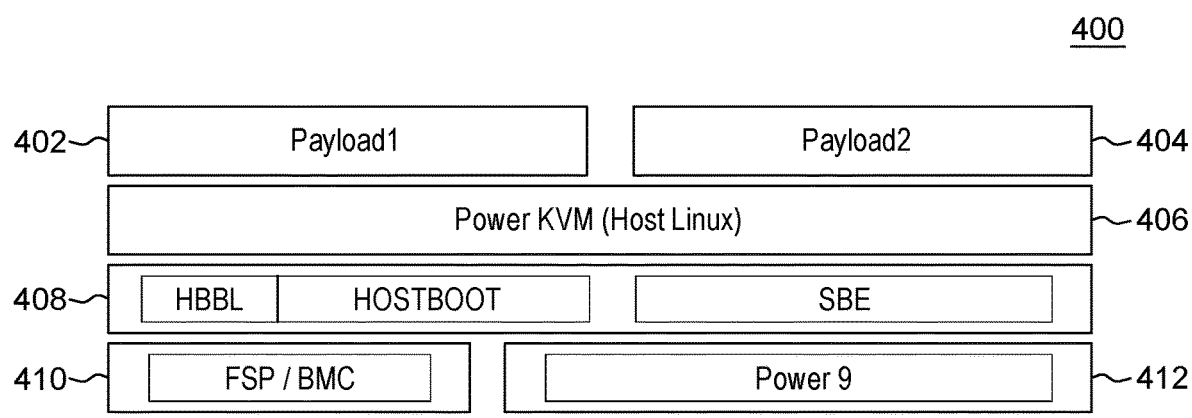
FIG. 4 is a block diagram showing a system stack according to embodiments of the present invention.

Diagram 400 of FIG. 4 shows a system stack diagram. Diagram 400 includes the following components: Payload1 402, Payload2 404, Power KVM 406, SBE/HBBL/HOSTBOOT 408, FSP/BMC 410 and Power9 412.

Some embodiments of the present invention may include one, or more, of the following features, characteristics and/or advantages: (i) the customer payloads/workloads registers with the SBE; (ii) the customer payloads/workloads share the encryption key for the same SBE through an API that is available on the Host; and (iii) the payload has an encryption key defined at some location which the host can pick up and pass it across to the SBE.

Some embodiments of the present invention may include one, or more, of the following features, characteristics and/or advantages: (i) the SBE needs to store the encryption key with respect to the payload; (ii) if a new payload is allocated to the an existing core/thread, then the new payload will over-write the present key in the SBE; (iii) once this infrastructure is up and assuming that a memory and HW register dump is required when payload crashes, then the SBE will be able to differentiate multiple payloads running in the system with the help of kernel data structures (such as task_struct or its equivalent); (iv) differentiates the SPRs/GPRs on a thread based on different payloads; (v) the dump (memory and registers) will then be encrypted with the saved keys per payload; (vi) offloading the encrypted dump can be done through several methods including using a Flexible Service Processor to fetch out the dump-related information; and (vii) the SBE can copy the dump-related information into a reserved memory space which the payload can access when it comes back online.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
receiving, by a hardware thread on a processor core, a set of user workload data, with the set of user workload data including sensitive secure information (SSI);
extracting the SSI from the processor core to obtain a first extracted SSI;

registering the first extracted SSI to a self-boot engine (SBE), with the registration including assigning an encryption key for the first extracted SSI;

receiving, by the hardware thread on the processor core, an update to the set of user workload data;

responsive to the receipt of the update to the set of user workload data, overwriting the encryption key for the first extracted SSI; and differentiating, by the SBE, the first extracted SSI and the update to the set of user workload data, with the SBE differentiating the first extracted SSI and the update to the set of user workload data on a hardware thread-by-hardware thread basis, wherein differentiating the first extracted SSI and the update to the set of user workload data on a hardware thread-by-hardware thread basis includes:

collecting hardware dump information associated with the set of user workload data; and analyzing the hardware dump information, wherein the hardware dump information is analyzed to avoid a hardware failure.

2. The method of claim 1 wherein the first extracted SSI and the update to the set of user workload data share the same encryption key.

3. The method of claim 1 wherein the differentiation between the first extracted SSI and the update to the set of user workload data is performed by a kernel data structure.

4. The method of claim 1 further including:
offloading, by a flexible service processor, the first extracted set of SSI by fetching out dump-related data included in the first extracted set of SSI.

5. The method of claim 1 further including:
offloading, by the SBE, the first extracted set of SSI by copying data included in the first extracted set of SSI into a reserved memory space.

6. The method of claim 1 wherein the encryption key is shared with the SBE through a host kernel.

7. A computer program product (CPP) comprising:
a machine readable storage device; and
computer code stored on the machine readable storage device, with the computer code including instructions and data for causing a processor set to perform operations including the following:

receiving, by a hardware thread on a processor core, a set of user workload data, with the set of user workload data including sensitive secure information (SSI), extracting the SSI from the processor core to obtain a first extracted SSI, registering the first extracted SSI to a self-boot engine (SBE), with the registration including assigning an encryption key for the first extracted SSI, receiving, by the hardware thread on the processor core, an update to the set of user workload data, responsive to the receipt of the update to the set of user workload data, overwriting the encryption key for the first extracted SSI, and differentiating, by the SBE, the first extracted SSI and the update to the set of user workload data, with the SBE differentiating the first extracted SSI and the update to the set of user workload data on a hardware thread-by-hardware thread basis, wherein differentiating the first extracted SSI and the update to the set of user workload data on a hardware thread-by-hardware thread basis includes:

collecting hardware dump information associated with the set of user workload data; and analyzing the hardware dump information, wherein the hardware dump information is analyzed to avoid a hardware failure.

8. The CPP of claim 7 wherein the first extracted SSI and the update to the set of user workload data share the same encryption key.

9. The CPP of claim 7 wherein the differentiation between the first extracted SSI and the update to the set of user workload data is performed by a kernel data structure.

10. The CPP of claim 7 further including:
offloading, by a flexible service processor, the first extracted set of SSI by fetching out dump-related data included in the first extracted set of SSI.

11. The CPP of claim 7 further including:
offloading, by the SBE, the first extracted set of SSI by copying data included in the first extracted set of SSI into a reserved memory space.

12. The CPP of claim 7 wherein the encryption key is shared with the SBE through a host kernel.

13. A computer system (CS) comprising:
a processor set;
a machine readable storage device; and
computer code stored on the machine readable storage device, with the computer code including instructions and data for causing the processor set to perform operations including the following:

receiving, by a hardware thread on a processor core, a set of user workload data, with the set of user workload data including sensitive secure information (SSI), extracting the SSI from the processor core to obtain a first extracted SSI, registering the first extracted SSI to a self-boot engine (SBE), with the registration including assigning an encryption key for the first extracted SSI, receiving, by the hardware thread on the processor core, an update to the set of user workload data, responsive to the receipt of the update to the set of user workload data, overwriting the encryption key for the first extracted SSI, and differentiating, by the SBE, the first extracted SSI and the update to the set of user workload data, with the SBE differentiating the first extracted SSI and the update to the set of user workload data on a hardware thread-by-hardware thread basis, wherein differentiating the first extracted SSI and the update to the set of user workload data on a hardware thread-by-hardware thread basis includes:

collecting hardware dump information associated with the set of user workload data; and analyzing the hardware dump information, wherein the hardware dump information is analyzed to avoid a hardware failure.

14. The CS of claim 13 wherein the first extracted SSI and the update to the set of user workload data share the same encryption key.

15. The CS of claim 13 wherein the differentiation between the first extracted SSI and the update to the set of user workload data is performed by a kernel data structure.

16. The CS of claim 13 further including:
offloading, by a flexible service processor, the first extracted set of SSI by fetching out dump-related data included in the first extracted set of SSI.

17. The CS of claim 13 further including:
offloading, by the SBE, the first extracted set of SSI by copying data included in the first extracted set of SSI into a reserved memory space.

18. The CS of claim 13 wherein the encryption key is shared with the SBE through a host kernel.

\* \* \* \* \*